US007359709B2

(12) United States Patent
Green et al.

(10) Patent No.: US 7,359,709 B2
(45) Date of Patent: Apr. 15, 2008

(54) METHODS AND APPARATUS FOR INTER-BSC SOFT HANDOFF

(75) Inventors: Michael Green, Zichron Yaacov (IL); Boaz E. Bryger, Zichron Yaacov (IL); Jeremy M. Stein, Haifa (IL); Sergio Kolor, Haifa (IL)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 11/168,910

(22) Filed: Jun. 28, 2005

(65) Prior Publication Data

US 2006/0084436 A1    Apr. 20, 2006

Related U.S. Application Data

(60) Provisional application No. 60/584,436, filed on Jun. 29, 2004.

(51) Int. Cl.
*H04Q 7/20* (2006.01)
*H04Q 7/00* (2006.01)

(52) U.S. Cl. ............... 455/442; 455/436; 455/438; 455/443; 370/331

(58) Field of Classification Search ............... 455/442, 455/417, 439, 436, 435.1, 448, 438; 370/331, 370/338
See application file for complete search history.

(56) References Cited

U.S. PATENT DOCUMENTS 5,956,641 A    9/1999    Bruckert et al.
5,991,628 A *  11/1999   Pedziwiatr et al. ......... 455/443
6,064,885 A *  5/2000    Rouhollahzadeh et al. . 455/439
6,085,089 A *  7/2000    Emmer et al. .............. 455/439
6,108,547 A    8/2000    Yamashita et al.
6,792,283 B1 * 9/2004    Roberts et al. ............. 455/525
6,826,402 B1 * 11/2004   Tran .......................... 455/438
6,901,257 B2 * 5/2005    Kubota ...................... 455/439
2002/0071403 A1* 6/2002  Crowe et al. ............... 370/331
2002/0072371 A1* 6/2002  Hokkanen .................. 455/438
2003/0060200 A1  3/2003  Soliman
2003/0104815 A1* 6/2003  Lee ............................ 455/436
2006/0281464 A1* 12/2006 Kwun et al. ................ 455/442

FOREIGN PATENT DOCUMENTS

WO    WO 96/26617    *   8/1996

* cited by examiner

*Primary Examiner*—George Eng
*Assistant Examiner*—Brandon J. Miller
(74) *Attorney, Agent, or Firm*—Sandip S. Minhas; Abdollah Katbab; Thomas Rouse (57) ABSTRACT

A method for performing a soft handoff, including establishing a first control channel via a network between a first BSC and a first BTS. The method also includes establishing a second control channel via the network between a second BSC and a second BTS. A call between a mobile station (MS) and the first BTS is established, and while the call continues an indication is sent to the first BSC that the MS has received a signal from the second BTS. In response to the indication, a trigger is conveyed from the first BSC to the second BTS, and, in response to receiving the trigger at the second BTS, further traffic associated with the call is directed between the MS, the second BTS, and the first BSC, without conveying the further traffic through the second BSC.

27 Claims, 4 Drawing Sheets

METHODS AND APPARATUS FOR INTER-BSC SOFT HANDOFF

CROSS-REFERENCE TO RELATED APPLICATION

This application claims the benefit of U.S. Provisional Patent Application 60/584,436, entitled "METHODS AND APPARATUS FOR INTER-BSC SOFT HANDOFF" filed Jun. 29, 2004, which is incorporated herein by reference.

FIELD OF THE INVENTION

Embodiments of the invention relate generally to cellular telephone communications, and specifically to the soft handoff of such communications.

BACKGROUND OF THE INVENTION

Soft handoff is a process whereby, in a code division multiple access (CDMA) communication system, one mobile station (MS) may communicate with two or more sectors and/or with two or more cells substantially simultaneously. Typically the process occurs during transfer of the MS from one cell or sector to another. The TIA/EIA/IS-2001.3-B standard for the CDMA system, published by the Telecommunications Industry Association (TIA) of Arlington, Va., describes how a soft handoff may be implemented. The standard is incorporated herein by reference.

A CDMA system usually has a number of base station controllers (BSCs) communicating with a mobile switching center (MSC) via an "A" interface. Each BSC is typically connected in a point-to-point geographical configuration to a number of base transceiver stations (BTSs), the BSC and the BTSs communicating via an "Abis" interface in Abis sessions. A specific BSC controls the activities of the BTSs to which it is connected, and is used by the BTSs for activities such as call setup and teardown, as well as for administrative tasks. The BTSs in turn communicate over-the-air with MSs via a CDMA air interface. In addition, BSCs may communicate with each other via an A3/A7 interface. Each interface corresponds to a signaling protocol known in the art. For example, the A3/A7 interface is described in the above referenced TIA standard; the Abis interface is described in a TIA/EIA-828 standard, published by the TIA, which is incorporated herein by reference.

A soft handoff occurs when the MS communicates simultaneously with two or more BTSs. The BTSs may be coupled to the same BSC, and/or to different BSCs. In systems known in the art, if all the BTSs are coupled to one BSC, the interfaces involved are the CDMA air interface and the Abis interface. If the BTSs are coupled to two or more BSCs, the communication uses three interfaces: the CDMA air interface, the Abis interface, and the A3/A7 interface between the BSCs.

SUMMARY OF THE INVENTION

In embodiments of the invention, base station controllers (BSCs) of a code division multiple access (CDMA) system are linked with base transceiver stations (BTSs) of the system via a network, typically a packet switching network operating under a protocol such as the Internet Protocol. Each BTS is thus able to establish communication via multiple links with many BSCs, and each BSC is able to establish communication via multiple links with many BTSs.

Each BTS is affiliated with a certain BSC, typically on a geographical basis. Each BSC maintains a control channel link with its affiliated BTSs via the network. The control channel links enable the BSC to manage specific tasks, such as call setup, for the BTSs with which it is affiliated.

In addition to the control channel link with the BSC with which it is affiliated, a given BTS may also use the links to communicate directly with other BSCs during soft handoff. This sort of direct communication is in distinction to the handoff model used in systems known in the art, in which each BTS communicates only with the BSC with which it is affiliated. In particular, a given BSC may open communication sessions with BTSs that are affiliated with other BSCs but have transmission coverage areas that overlap those of the BTSs affiliated with the given BSC. (These BTSs are herein termed adjoining BTSs.) As a result, adjoining BTSs are able to perform soft handoffs with an affiliated BTS by communicating only with the given BSC. This model is in contrast with inter-BSC handoffs in systems known in the art, in which both BSCs must be involved. The model thus permits more efficient, reliable soft handoffs, and also reduces hardware costs compared to inter-BSC handoff systems.

In a first type of soft handoff, a mobile station (MS) which is conducting a call via a first BTS affiliated with a BSC, herein termed the anchor BSC, receives a pilot signal from a second BTS adjoining the first BTS. The second BTS is affiliated with a BSC, herein termed the target BSC, different from the anchor BSC. The MS sends a notification of receipt of the pilot signal to the anchor BSC. The anchor BSC, in turn, sends a trigger to the second BTS that causes the second BTS to route call traffic with the MS from the second BTS to the anchor BSC. The anchor BSC thus receives uplink call traffic signals from the two adjoining BTSs, despite the second BTS being affiliated with a different BSC. The anchor BSC processes the uplink call traffic signals it receives to find an optimum uplink signal. In a similar manner, downlink call traffic signals are sent from the anchor BSC to the two adjoining BTSs; the MS receives transmissions from the BTSs, and processes the transmissions it receives to find an optimum downlink signal.

A substantially similar process may be applied in a second type of soft handoff, between two BTSs affiliated with the same BSC, a difference between the two types being that during the second type of soft handoff no signal rerouting needs to be performed. Using one protocol for both types of soft handoff improves the efficiency of operation of the network and eliminates the need for transferring call traffic between BSCs in the first type of soft handoff.

There is therefore provided, according to an embodiment of the invention, a method for performing a soft handoff, including:

establishing a first control channel link via a network between a first base station controller (BSC) and a first base transceiver station (BTS), the first control channel link enabling the first BSC to control operation of the first BTS;

establishing a second control channel link via the network between a second BSC and a second BTS, the second control channel link enabling the second BSC to control operation of the second BTS;

establishing a call in the system between a mobile station (MS) and the first BTS under control of the first BSC;

while continuing to conduct the call, conveying an indication to the first BSC that the MS has received a signal from the second BTS;

in response to the indication, conveying a call transfer control trigger from the first BSC to the second BTS via the network; and in response to receiving the call transfer control trigger at the second BTS, directing further traffic associated with the call between the MS, the second BTS, and the first BSC, without conveying the further traffic through the second BSC.

Typically, establishing the first control channel link includes establishing a first reliable connection between the first BSC and the first BTS, and using the first reliable connection for the first control link, and establishing the second control channel link includes establishing a second reliable connection between the second BSC and the second BTS, and using the second reliable connection for the second control link.

In one embodiment, the signal received from the second BTS is a pilot signal.

The method may also include establishing a connection in the network between the first BSC and the second BTS, and conveying the call transfer control trigger includes conveying the trigger via the connection, and the connection is typically a reliable connection.

The network may include a packet switching network operating under an Internet Protocol.

The method may also include generating an optimum signal for the call from the further traffic and from traffic associated with the call that is conveyed between the MS, the first BTS, and the first BSC.

In a disclosed embodiment, the method includes:

establishing a third control channel link via the network between the first BSC and a third BTS, the third control channel link enabling the first BSC to control operation of the third BTS;

establishing a further call in the system between the MS and the first BTS;

while continuing to conduct the further call, conveying a further indication to the first BSC that the MS has received a signal from the third BTS; and in response to the further indication, directing further traffic associated with the further call between the MS, the third BTS, and the first BSC.

Establishing the call may include conveying traffic and the further traffic associated with the call using a connectionless protocol.

There is further provided, according to an embodiment of the invention, apparatus for performing a soft handoff, including:

a first base transceiver station (BTS);

a first base station controller (BSC) which is adapted to establish a first control channel link via a network between the first BTS and the first BSC, the first control channel link enabling the first BSC to control operation of the first BTS;

a second BTS;

a second BSC which is adapted to establish a second control channel link via the network between the second BTS and the second BSC, the second control channel link enabling the second BSC to control operation of the second BTS; and a mobile station (MS) which is adapted to establish a call in the system between the MS and the first BTS under control of the first BSC, and, while continuing to conduct the call, to convey an indication to the first BSC that the MS has received a signal from the second BTS, wherein the first BSC, in response to the indication, is adapted to convey a call transfer control trigger from the first BSC to the second BTS via the network, and wherein the second BTS, in response to receiving the call transfer control trigger, is adapted to direct further traffic associated with the call between the MS, the second BTS, and the first BSC, without conveying the further traffic through the second BSC.

Embodiments of the invention will be more fully understood from the following detailed description of the embodiments thereof, taken together with the drawings, a brief description of which is given below.

DETAILED DESCRIPTION OF EMBODIMENTS

A "mobile station" refers to a device providing voice and/or data connectivity to a user. A mobile station may be connected to a computing device such as a laptop computer or desktop computer, or it may be a self contained device such as a personal digital assistant. An mobile station can also be called a access terminal, subscriber station, subscriber unit, mobile station, wireless device, mobile, remote station, remote terminal, user terminal, user agent, or user equipment. A subscriber station may be a cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

A combination of a base transceiver station (BTS) and a base station controller (BSC) may also be called an "access point", which refers to a device in an access network that communicates over the air-interface, through one or more sectors, with the access terminals or other access points. The access point acts as a router between the access terminal and the rest of the access network, which may include an IP network, by converting received air-interface frames to IP packets. Access points also coordinate the management of attributes for the air interface.

Figure 1:
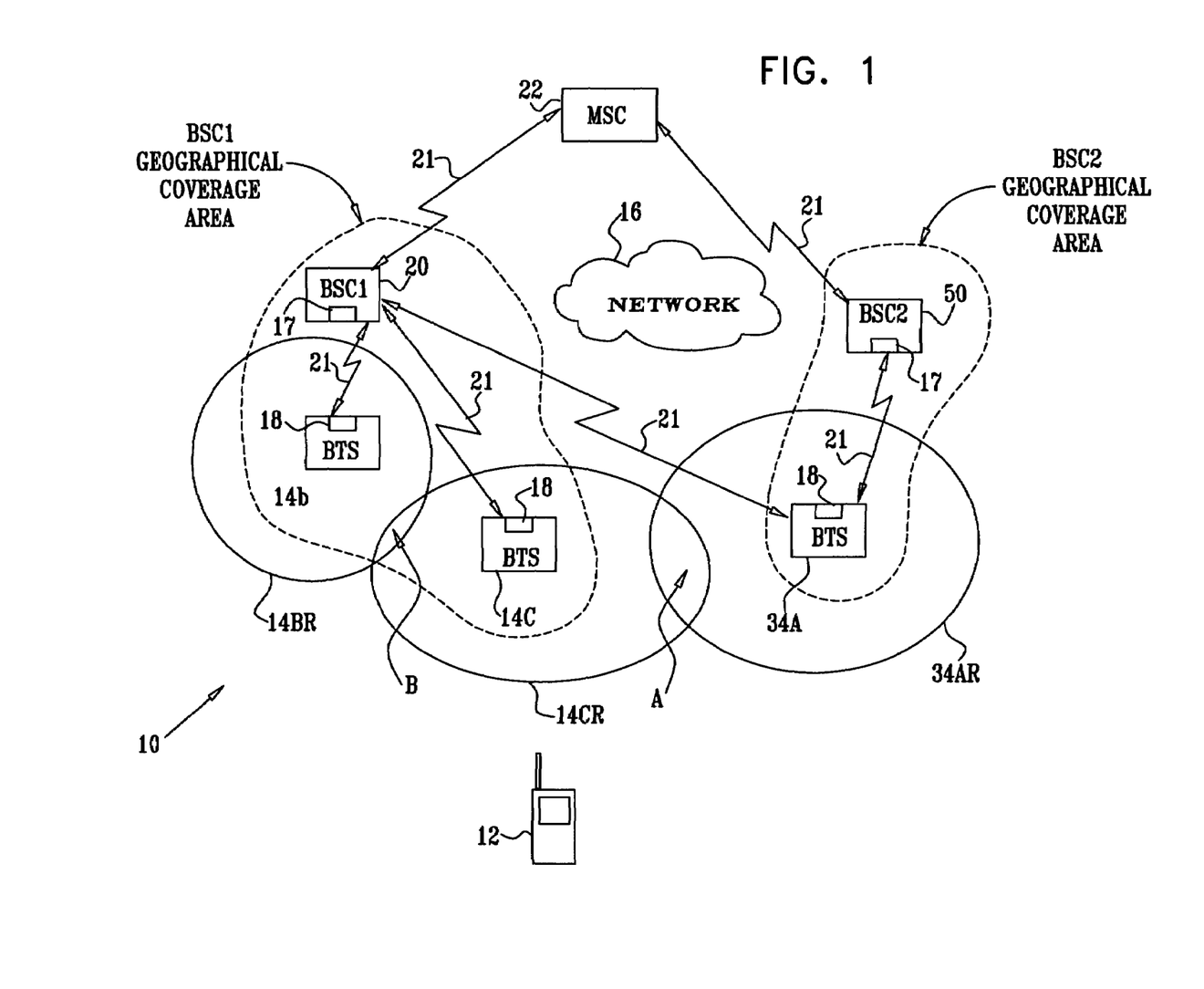
FIG. 1 is a schematic illustration of a code division multiple access (CDMA) cellular system, according to an embodiment of the present invention.

Reference is now made to FIG. 1, which is a schematic illustration of a code division multiple access (CDMA) cellular system 10, according to an embodiment of the invention. A CDMA system is used for illustrative purposes, as it is contemplated that embodiments of the invention may be employed in systems using different modulation schemes. For example, a Wide-band code division multiple access (WCDMA), a frequency division multiple access (FDMA), a time division multiple access (TDMA), or an orthogonal frequency division multiple access (OFDMA) modulation schemes may also be used.

A first base station controller 20 (BSC1) is affiliated with a first plurality of generally similar base transceiver stations (BTSs) 14B, 14C, . . . A second BSC 50 (BSC2) is affiliated with a second plurality of generally similar BTSs 34A, . . . For clarity, only BTS 14B and BTS 14C of the first plurality, and only BTS 34A of the second plurality, are shown in FIG. 1. Each BSC is responsible for specific tasks, such as call setup and tear-down, for each of its affiliated BTSs. Each BSC is also responsible for administration of its affiliated BTSs. The affiliations are typically assigned on a geographical basis, so that by way of example FIG. 1 shows BSC1 as having a geographical coverage area (GCA) which includes BTS 14B and BTS 14C, and shows BSC2 as having a GCA which includes BTS 34A. Properties associated with the affiliations are described in more detail hereinbelow. The BSCs communicate with a mobile switching center (MSC) 22.

In embodiments of the invention, elements of system 10, comprising the MSC, the BSCs, and the BTSs, are incorporated into a network 16, which allows each of these elements to set up communication links with other elements of the system. Logical connections 21, typically implemented by landline and/or microwave links between the network elements, are used to form network 16. Examples of specific logical connections formed between network elements are described in more detail below. Hereinbelow, by way of example, network 16 is assumed to be a packet switching network using an Internet Protocol (IP). As described in more detail below, communications between elements of the IP network use one of two transport protocols: a connectionless protocol, herein assumed to be a User Datagram Protocol (UDP), or a reliable connection protocol, herein assumed to be a Transmission Control Protocol (TCP). It will be understood, however, that embodiments of the present invention are not limited to operating with a specific type of network or a specific type of protocol, and that substantially any suitable network and/or protocol that allows multiple connection-based or connectionless links between elements of the system may be used for the communication between the MSC, the BSCs, and the BTSs.

Each BTS has a respective geographical transmission area, wherein mobile stations in its transmission area are able to communicate with the BTS. The transmission areas of the BTSs of system 10 are schematically illustrated in FIG. 1 and are identified by suffixes R. Thus, the transmission area of BTS 14B is an area 14BR. System 10 operates by configuring the geographical transmission areas of BTSs to overlap or to be contiguous. In system 10 a mobile station (MS) 12 is able to communicate over-the-air with the BTSs according to, inter alia, the transmission area or areas in which the mobile station is physically located.

An interface, such as an Abis interface between BSC1 and BTSs 14B, 14C, . . . , is used to establish a reliable logical connection between the BSC and the BTSs, and the connection using the Abis interface is termed an Abis session. In other types of communication systems, a different interface may be used as a logical connection between such infrastructure sub-systems. In order to establish the Abis sessions, BSC1 has an Abis server 17, and BTSs 14B, 14C each have an Abis client 18. Similarly, BSC2 sets up a reliable logical connection with its BTSs via the Abis interface, BSC2 having an Abis server 17, and BTSs 34A, . . . each having an Abis client 18. Each Abis server waits for a request from an Abis client in order to establish a connection. The connections formed using the Abis interface are TCP/IP connections.

In other embodiments of the invention, call data transmitted between BSCs and BTSs may comprise voice frames, i.e., fundamental channel (FCH) traffic frames, and/or data frames, i.e. supplemental channel (SCH) traffic frames. In addition, the call data may also comprise information for other channels, such as paging and pilot channels, operative in network 10. As is described in more detail below, the call data is transmitted between the BSCs and BTSs as UDP packets.

Referring back to the affiliation described above, in order to perform its responsibilities for its affiliated BTSs, each BSC opens respective control channel links with these BTSs via its Abis sessions. Each BSC uses its control channel links to transfer commands and information regarding the responsibilities. The responsibilities include allocation of resources at the BTSs and the MS during call setup, and resource deallocation during teardown.

In system 10 there are two types of soft handoff, both occurring when MS 12 is in a region having transmission areas from more than one BTS. A first type of soft handoff occurs when MS 12 is in a region where the multiple transmission areas are from BTSs that do not have the same controlling BSC; such a region is region A in FIG. 1. A second type of soft handoff occurs when the MS is in a region where the multiple transmission areas are from BTSs that do have the same BSC as a controller; region B is an example of such a region.

Figure 2:
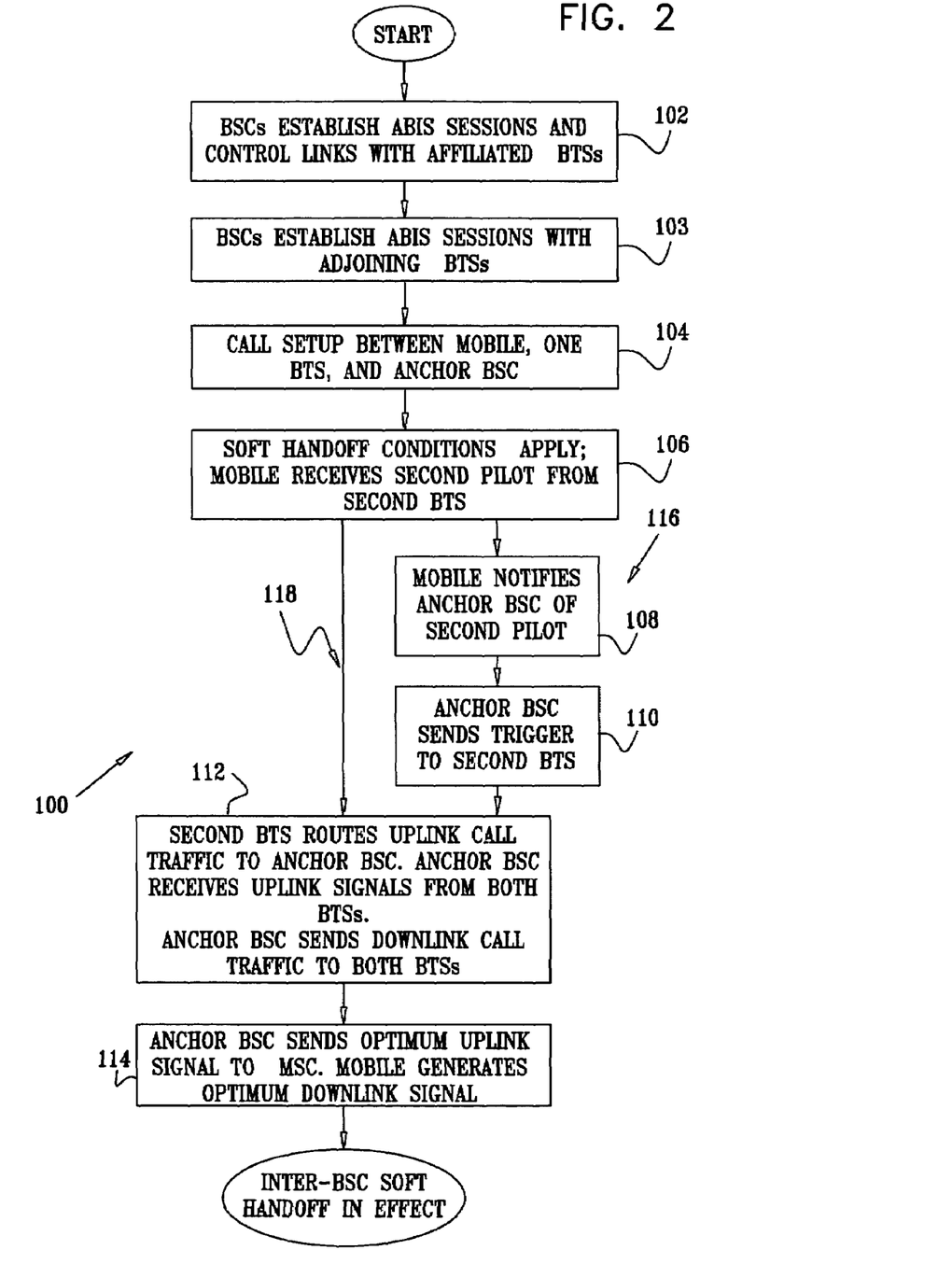
FIG. 2 is a flowchart showing steps that are implemented in performing soft handoffs in the system of FIG. 1, according to an embodiment of the present invention.
Figure 3:
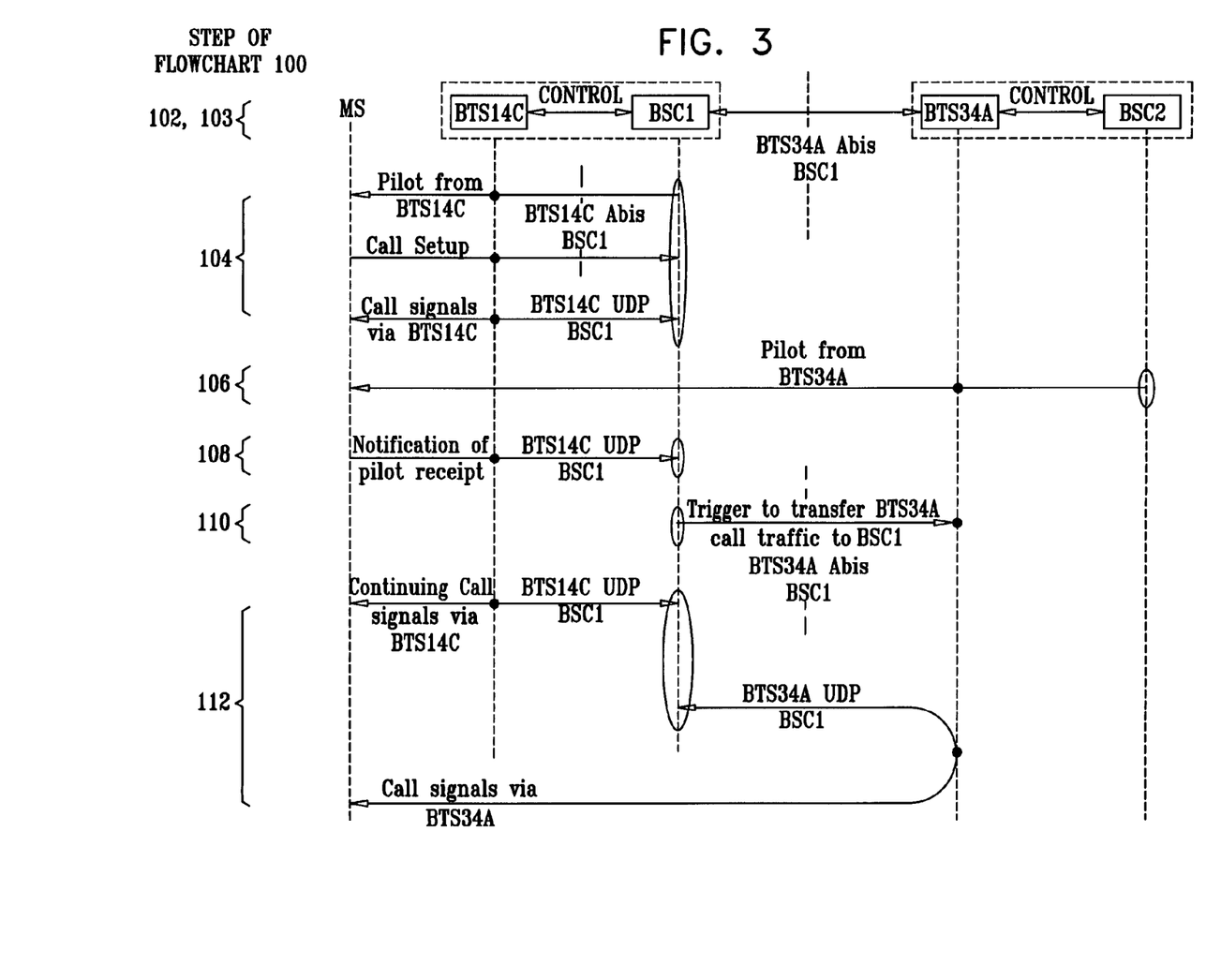
FIG. 3 illustrates a signal sequence generated in a first type of soft handoff, according to an embodiment of the present invention.
Figure 4:
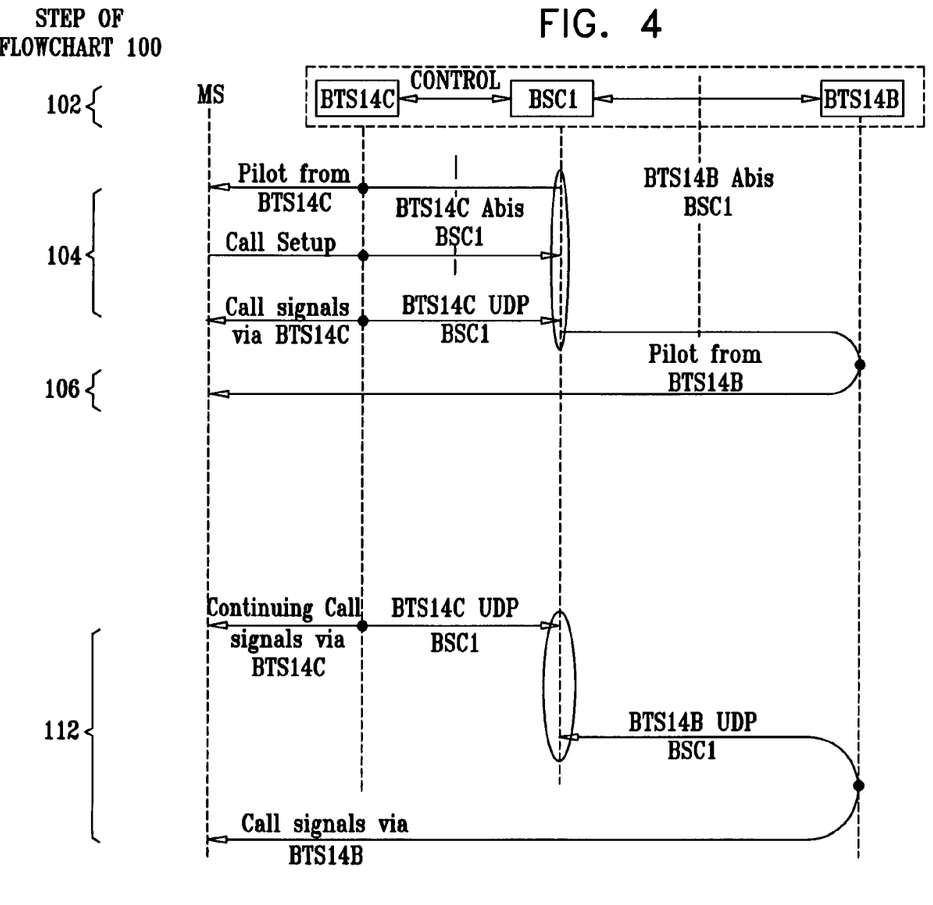
FIG. 4 illustrates a signal sequence generated in a second type of soft handoff, according to an embodiment of the present invention.

FIG. 2 is a flowchart 100 showing steps that are implemented in performing soft handoffs in system 10, FIG. 3 illustrates a signal sequence generated in the first type of soft handoff, and FIG. 4 illustrates a signal sequence generated in the second type of soft handoff, according to an embodiment of the present invention.

In a first step 102 of flowchart 100, each BSC establishes respective Abis sessions with its affiliated BTSs, and then establishes respective control links to the affiliated BTSs via the Abis sessions. It will be understood that the Abis sessions and control links established in step 102 use packets and/or data transmitted according to the protocols operated by network 16.

In a second step 103, each BSC establishes Abis sessions with BTSs adjoining its affiliated BTSs. In the present specification and in the claims, an adjoining BTS of a given BTS is assumed to be one that is able to perform a soft handoff with the given BTS, but the two BTSs are not affiliated with the same BSC. The following examples to explain the concept of adjoining BTSs use the schematic transmission areas shown in FIG. 1. In a first example, BTS 14B is only able to perform soft handoffs with BTS 14C, because the transmission area of BTS 14B only overlaps the area of BTS 14C. BTS 14B thus has no adjoining BTSs. In a second example, BTS 14C is able to perform soft handoffs with BTS 34A (as well as with BTS 14B) because the transmission areas of the two BTS 14C and BTS 34A overlap; in this case BTS 14C and BTS 34A are adjoining BTSs since they are controlled by different BSCs.

The links established in steps 102 and 103 are illustrated in FIGS. 1, 3, and 4. BSC1 establishes a control link with BTS 14C and with BTS 14B via Abis sessions with these BTSs. BSC2 establishes a control link with BTS 34A via a respective Abis session. In addition, BSC1 establishes an Abis session with BTS 34A. For clarity, other Abis sessions that may be established in steps 102 and 103 are not shown in FIG. 1, 3, or 4; such a link includes an Abis session established between BSC2 and BTS 14C.

In a third step 104, a call is set up between MS 12 and one of the BTSs, by way of example assumed to be BTS 14C, herein also termed the initial BTS. The call comprises both uplink and downlink signals between MS 12 and BTS 14C, and MS 12 is able to set up the call on receipt of a pilot signal from BTS 14C. The signals used during step 104 are schematically shown in FIGS. 3 and 4. At call setup, it is assumed that soft handoff conditions do not apply, i.e., that MS 12 is only in the coverage area of BTS 14C. Thus, during step 104, initial BTS 14C and BSC1, herein termed the anchor BSC, use their control link to set up resources for the call.

Once the call has been set up, uplink and downlink traffic for the call is transmitted between BTS 14C and the anchor BSC using UDP packets.

In a fourth step 106, MS 12 moves into a region wherein soft handoff conditions apply, corresponding to a situation where the MS is in the transmission area of more than one BTS. As stated above, there are two types of soft handoff. In both types MS 12 becomes aware of being in a region where soft handoff conditions apply by receiving a pilot signal from a BTS other than the initial BTS.

Depending on the type of soft handoff situation, one of two paths are followed by flowchart 100. In the first type of handoff, a path 116 to a step 108 is followed. In the second type, a path 118 to a step 112 is followed.

In path 116, corresponding to FIG. 3, in step 108 MS 12 sends a notification to the anchor BSC, i.e., BSC1, indicating that it has received the pilot signal from BTS 34A. The notification is sent via a UDP packet from BTS 14C directed to the anchor BSC. It will be understood that the notification that is sent serves as an indication to the anchor BSC that MS 12 has moved into a first type of soft handoff condition, since BSC1 does not control BTS 34A.

In response to receiving the notification, in a step 110, anchor BSC1 sends a call transfer trigger to BTS 34A. The call transfer trigger is transmitted via the Abis session between anchor BSC1 and BTS 34A, set up in step 103.

In step 112, on receipt of the trigger, BTS 34A routes uplink call traffic from MS 12 to the anchor BSC, BSC1, rather than to its controlling BSC, BSC2. The uplink call traffic is transmitted using UDP packets directed to the anchor BSC. During step 112 anchor BSC1 continues to receive uplink call traffic via BTS 14C, as UDP packets.

The trigger also causes anchor BSC1 to send downlink call traffic for MS 12 to both BTS 14C and BTS 34A, using UDP packets directed to both BTSs. The two BTSs both transmit downlink signals, having the same call traffic, to MS 12.

In a final step 114, the anchor BSC, BSC1, uses the uplink UDP packets received from the BTSs to generate an optimum uplink signal. The optimum uplink signal is typically a frame having less noise than either of the transmissions received separately by the BTSs, as is known in the art. The anchor BSC then sends the optimum uplink signal to MSC 22.

Similarly in step 114, MS 12 generates an optimum downlink signal from the two sets of transmissions it receives from the separate BTSs.

If path 118 of the flowchart is followed, corresponding to FIG. 4, steps 108 and 110 are not performed, since the BTSs operating the second type of soft handoff are both controlled by the same BSC, anchor BSC1. Thus, step 106 is followed by step 112 in which BTS 14B automatically routes call traffic with MS 12 to the anchor BSC, BSC1, since BSC1 controls BTS 14B (as well as BTS 14C).

While the description above refers to signals comprising voice and data frames transmitted during a soft handoff, it will be understood that substantially the same process may be used for other signals, such as pilot strength signals, that may be transmitted during a soft handoff.

It will be appreciated that in the first type of soft handoff process described above, no call traffic is transferred between BSC1 and BSC2, since all call traffic is routed from the participating BTSs to one anchor BSC, in the example above BSC1. This is in contrast to prior art systems wherein call traffic in the first type of soft handoff situation is transferred between BSCs, typically via an A3/A7 interface.

It will thus be appreciated that the embodiments described above are cited by way of example, and that the invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for performing a soft handoff, comprising:
    establishing a first control channel link via a network between a first base station controller (BSC) and a first base transceiver station (BTS), the first control channel link enabling the first BSC to control operation of the first BTS;
    establishing a second control channel link via the network between a second BSC and a second BTS, the second control channel link enabling the second BSC to control operation of the second BTS;
    establishing a call in the system under control of the first BSC;
    while continuing to conduct the call, conveying an indication to the first BSC that a mobile station (MS) has received a signal from the second BTS;
    in response to the indication, conveying a call transfer control trigger from the first BSC to the second BTS via the network; and
    in response to receiving the call transfer control trigger at the second BTS, directing further traffic associated with the call between the MS, the second BTS, and the first BSC, without conveying the further traffic through the second BSC.

2. The method according to claim 1, wherein establishing the first control channel link comprises establishing a first reliable connection between the first BSC and the first BTS, and using the first reliable connection for the first control link, and wherein establishing the second control channel link comprises establishing a second reliable connection between the second BSC and the second BTS, and using the second reliable connection for the second control link.

3. The method according to claim 1, wherein the signal received from the second BTS comprises a pilot signal.

4. The method according to claim 1, and comprising establishing a connection in the network between the first BSC and the second BTS, and wherein conveying the call transfer control trigger comprises conveying the trigger via the connection.

5. The method according to claim 4, wherein the connection comprises a reliable connection.

6. The method according to claim 1, wherein the network comprises a packet switching network operating under an Internet Protocol.

7. The method according to claim 1, and comprising generating an optimum signal for the call from the further traffic and from traffic associated with the call that is conveyed between the MS, the first BTS, and the first BSC.

8. The method according to claim 1, and comprising: establishing a third control channel link via the network between the first BSC and a third BTS, the third control channel link enabling the first BSC to control operation of the third BTS; establishing a further call in the system between the MS and the first BTS; while continuing to conduct the further call, conveying a further indication to the first BSC that the MS has received a signal from the third BTS; and in response to the further indication, directing further traffic associated with the further call between the MS, the third BTS, and the first BSC.

9. The method according to claim 1, wherein establishing the call comprises conveying traffic and the further traffic associated with the call using a connectionless protocol.

10. Apparatus for performing a soft handoff, comprising:
a first base transceiver station (BTS);
a first base station controller (BSC) which is adapted to establish a first control channel link via a network between the first BTS and the first BSC, the first control channel link enabling the first BSC to control operation of the first BTS;
a second BTS;
a second BSC which is adapted to establish a second control channel link via the network between the second BTS and the second BSC, the second control channel link enabling the second BSC to control operation of the second BTS;
wherein the first BSC, in response to an indication to the first BSC that a mobile station (MS) has received a signal from the second BTS, is adapted to convey a call transfer control trigger from the first BSC to the second BTS via the network, and wherein the second BTS, in response to receiving the call transfer control trigger, is adapted to direct further traffic associated with the call between the MS, the second BTS, and the first BSC, without conveying the farther traffic through the second BSC.

11. The apparatus according to claim 10, wherein establishing the first control channel link comprises establishing a first reliable connection between the first BSC and the first BTS, and using the first reliable connection for the first control link, and wherein establishing the second control channel link comprises establishing a second reliable connection between the second BSC and the second BTS, and using the second reliable connection for the second control link.

12. The apparatus according to claim 10, wherein the signal received from the second BTS comprises a pilot signal.

13. The apparatus according to claim 10, wherein the first BSC is adapted to establish a connection in the network between the first BSC and the second BTS, and wherein conveying the call transfer control trigger comprises conveying the trigger via the connection.

14. The apparatus according to claim 13, wherein the connection comprises a reliable connection.

15. The apparatus according to claim 10, wherein the network comprises a packet switching network operating under an Internet Protocol.

16. The apparatus according to claim 10, wherein the first BSC is adapted to generate an optimum signal for the call from the further traffic and from traffic associated with the call that is conveyed between the MS, the first BTS, and the first BSC.

17. The apparatus according to claim 10, wherein the first BSC is adapted to establish a third control channel link via the network between the first BSC and a third BTS, the third control channel link enabling the first BSC to control operation of the third BTS, and wherein the MS is adapted to establish a further call in the system between the MS and the first BTS, and, while continuing to conduct the further call, to convey a further indication to the first BSC that the MS has received a signal from the third BTS, and wherein the first BSC, in response to the further indication, is adapted to direct further traffic associated with the further call between the MS, the third BTS and the first BSC.

18. The apparatus according to claim 10, wherein establishing the call comprises conveying traffic and the further traffic associated with the call using a connectionless protocol.

19. An apparatus for performing a soft handoff, comprising:
means for establishing a first control channel link via a network between a first base station controller (BSC) and a first base transceiver station (BTS), the first control channel link enabling the first BSC to control operation of the first BTS;
means for establishing a second control channel link via the network between a second BSC and a second BTS, the second control channel link enabling the second BSC to control operation of the second BTS; means for establishing a call in the system under control of the first BSC;
while continuing to conduct the call, means for conveying an indication to the first BSC that a mobile station (MS) has received a signal from the second BTS;
in response to the indication, means for conveying a call transfer control trigger from the first BSC to the second BTS via the network; and
in response to receiving the call transfer control trigger at the second BTS, means for directing further traffic associated with the call between the MS, the second BTS, and the first BSC, without conveying the further traffic through the second BSC.

20. The apparatus according to claim 19, wherein means for establishing the first control channel link comprises means for establishing a first reliable connection between the first BSC and the first BTS, and using the first reliable connection for the first control link, and wherein means for establishing the second control channel link comprises means for establishing a second reliable connection between the second BSC and the second BTS, and means for using the second reliable connection for the second control link.

21. The apparatus according to claim 19, wherein the signal received from the second BTS comprises a pilot signal.

22. The apparatus according to claim 19, and comprising means for establishing a connection in the network between the first BSC and the second BTS, and wherein means for conveying the call transfer control trigger comprises means for conveying the trigger via the connection.

23. The apparatus according to claim 22, wherein the connection comprises a reliable connection.

24. The apparatus according to claim 19, wherein the network comprises a packet switching network operating under an Internet Protocol.

25. The apparatus according to claim 19, and comprising means for generating an optimum signal for the call from the further traffic and from traffic associated with the call that is conveyed between the MS, the first BTS, and the first BSC.

26. The apparatus according to claim 19, and comprising: means for establishing a third control channel link via the network between the first BSC and a third BTS, the third control channel link enabling the first BSC to control operation of the third BTS; means for establishing a further call in the system between the MS and the first BTS; while continuing to conduct the further call, means for conveying a further indication to the first BSC that the MS has received a signal from the third BTS; and in response to the further indication, means for directing further traffic associated with the further call between the MS, the third BTS, and the first BSC.

27. The apparatus according to claim 19, wherein means for establishing the call comprises means for conveying traffic and the further traffic associated with the call using a connectionless protocol.

\* \* \* \* \*